United States Patent [19]

Campion et al.

[11] 4,301,764
[45] Nov. 24, 1981

[54] INSTALLATION FOR ELECTROSTATIC DEPOSITION OF POWDER ON OBJECTS

[75] Inventors: Michel Campion, Bitche; Alain Gernez, St. Jean de la Ruelle, both of France

[73] Assignee: Compagnie Europeenne pour l'Equipement Menager "CEPEM", Paris, France

[21] Appl. No.: 97,112

[22] Filed: Nov. 20, 1979

[30] Foreign Application Priority Data

Nov. 21, 1978 [FR] France ................. 78 32753

[51] Int. Cl.³ ............................... B05B 5/02
[52] U.S. Cl. ................. 118/634; 118/309; 118/312
[58] Field of Search ......... 118/312, 634, 309; 427/345; 98/115 SB

[56] References Cited

U.S. PATENT DOCUMENTS

| | | | |
|---|---|---|---|
| 3,439,649 | 4/1969 | Probst et al. | 118/634 |
| 3,486,921 | 12/1969 | Wallis | 427/196 |
| 3,921,576 | 11/1975 | Vertue | 118/634 |
| 4,153,008 | 5/1979 | Marino et al. | 118/634 |

FOREIGN PATENT DOCUMENTS 1365637  9/1974  United Kingdom .

*Primary Examiner*—Evan K. Lawrence
*Attorney, Agent, or Firm*—Sughrue, Mion, Zinn, Macpeak and Seas

[57] ABSTRACT

An installation for electrostatic deposition of powder on objects travelling continuously, by means of a conveyor, through a treatment cage with a side entrance and exit comprises a filtering system, a system for supplying powder and compressed air and a tank for recovery of powder. The cage comprises at least two modules, namely, a first module for storing, projecting and recovering powder, which contains elements for projection of powder onto the objects to be processed, and a second module for filtering and recycling the air in which the air loaded with powder originating from the first module is filtered and recycled to the first module. The cage includes at least one air lock to prevent escape of powder laden air to the exterior of the cage.

21 Claims, 11 Drawing Figures

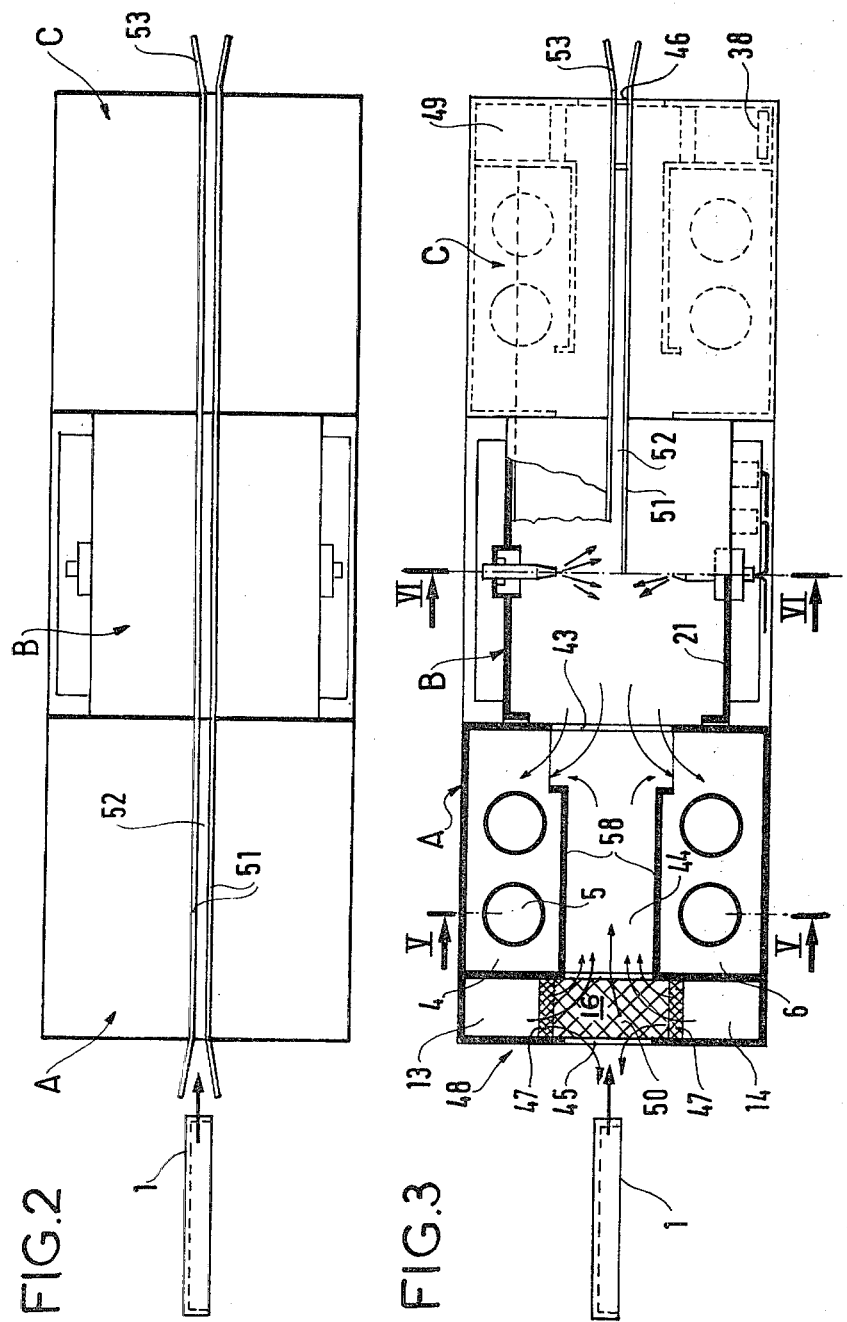

INSTALLATION FOR ELECTROSTATIC DEPOSITION OF POWDER ON OBJECTS

FIELD OF THE INVENTION

The present invention concerns the covering of pieces by a process of electrostatic powder deposition according to which there is projected into the interior of a cage containing the piece to be covered a cloud of electrified enamel powder which adheres to the piece as a result of the effect of electrostatic forces. A subsequent thermal treatment, applied to the piece, allows the layer of powder to be changed into a coating of enamel.

BACKGROUND OF THE INVENTION

Known cages for electrostatic deposition of powder present a large number of disadvantages. These cages taking in air from outside necessitate a very large external filtering system, with expulsion of the air into the surrounding premises and/or to the exterior. The filters generally comprise a system for reconditioning filtering elements which causes the powder to fall into a tank for recovery of powder. A transporter decants this powder into an auxiliary tank for supplying elements for depositing powder on one face of the piece after having passed through a sifter. One part of this powder may be decanted from the auxiliary tank into another tank by a transport system for supplying projection elements used for depositing powder on the other face of the piece if need be.

The unused powder comes from an external container via a transport system to the sifter. The transport systems are generally pneumatic; it is therefore necessary to add air-powder separation elements of the cyclone type. The coupling tubings take up space and are the site of rapid wear and make access to the various elements of the cage difficult. Generally, these cages do not allow recycling of the air and they also necessitate the conditioning of a significant volume of air coming from the workshop; to do this, a large battery of heating elements in continuous use and a humidifying system are required. A significant improvement can be made by reintroducing the aspiration air, after filtering, into a building containing the projection cage; this means makes the installation complicated and creates problems, more especially because the environment in this building must be acceptable to those who have to work there. Certain cages necessitate someone entering the powdering enclosure to change the type of powder projector; operating conditions are consequently difficult in view of the atmosphere prevailing in the cage and dangerous because of the proximity of heating elements. When completely equipped (tanks, filters, coupling tubing . . . ), these cages occupy a large area and volume in the workshop.

SUMMARY OF THE INVENTION

Preferred embodiments of the present invention remedy these disadvantages by realising an integrated type of powder deposition installation, in which the circuits for recycling powder and for supplying fresh powder are short, operating by gravity without a pumping system.

The present invention provides an installation for electrostatic deposition of powder on objects travelling continuously, by means of a conveyor, through a treatment cage with a side entrance and exit comprising a filtering system, a system for supplying powder and compressed air and a tank for recovery of powder. The cage comprises at least two modules, namely, a first module for storing, projecting and recovering powder, said module containing elements for projection of powder onto the objects to be processed, and a second module for filtering and recycling the air in which the air loaded with powder originating from the first module is filtered and recycled to the first module.

An embodiment of the invention is described by way of example with reference to the accompanying drawings.

BRIEF DESCRIPTION OF THE DRAWINGS

FIG. 2 is a view from above of the cage of FIG. 1;

FIG. 3 is a view partly in section along the line III—III of FIG. 1;

DESCRIPTION OF PREFERRED EMBODIMENTS

Figure 1:
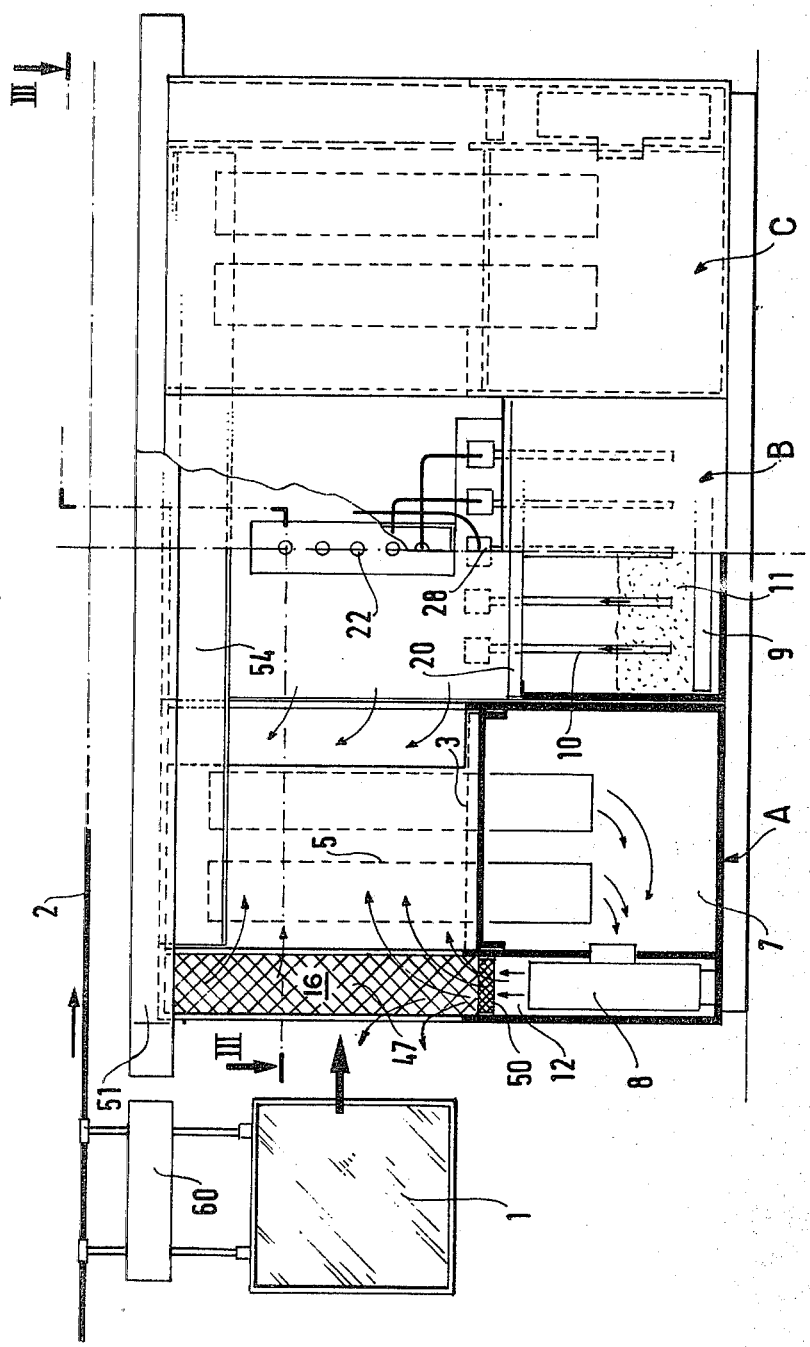
FIG. 1 is a view in elevation of a powder deposition cage.

In the embodiment represented in FIGS. 1, 2 and 3, a cage comprises three modules A, B and C: the module A serves as inlet air-lock preventing any powder from escaping through the piece-admitting entrance, the central module B is intended for the deposition of powder, and the module C is the outlet air-lock. The inlet air-lock A and the outlet air-lock C are constituted by generally identical modules. Pieces 1 placed on a conveyor 2 enter through the inlet module A, pass through the module B and leave through the outlet module C.

The inlet/outlet modules comprise two aspiration boxes or chambers 4 and 6 containing filtering elements 5; these filters 5 are of any type but the use of cartridges, for example of paper pleated around a wire-frame cylinder, allows reduction of the volume of the boxes 4 and 6. The box 6 can contain a number of filtering elements different from that in the box 4, the quantity of filters being controlled by the conditions of use of the filters and by the transit cross-sections of the pieces.

These two boxes will generally be equipped with the same filters and in the same quantity. A box or chamber 7 allows coupling of the boxes 4 and 6 to the same ventilator blower 8; it also contains a system for reconditioning the filtering elements, for example an unclogging unit; advantageously the ventilator 8 is disposed inside the box 7.

The module A comprises an inlet air-lock 48 and the module C an outlet air-lock 49, each containing two vertical filters 47 and a horizontal filter 50 forming a separation between the compartment in which the pieces circulate and the boxes for recycling air. Walls 58 form a central passage to separate the flow of air loaded with powder coming from the central powder-depositing module, from the flow of air recycled after filtering which comes from the air-locks.

The powder which falls from the filters is recovered on a fluidization element 3, before going into the reserve or container of powder 11 situated in cage module B. A box or chamber 12 allows separation of the flow of clean air towards the boxes or chambers 13 and 14. The boxes 13 and 14 contain the filters 47 which have three functions: primarily to effect filtering, secondly to distribute the flow of air in the space 16 in order to obtain a laminar, spreading flow over the whole path of the piece, in particular to avoid blowing the powder on the pieces and thirdly to avoid polluting the workshop in the event that the filter 5 breaks. The air expelled into the workshop can be purified through an ultrafilter which can be the filter 47 or a supplementary filter. The boxes 13 and/or 14 can also contain a conditioning system 38 for the recycling air, so that the content of the cage may be in optimal conditions for deposition of powders and treatment of powder not deposited. Recycling is very advantageous because it processes only a small volume of air.

The inlet and outlet modules of the cage incorporate aspiration systems and allow recycling of the air in optimal conditions dictated by the use of filtering cartridges and the retention of powder on the elements to be processed. Recycling avoids aspiration of the air into the workshop; it thus allows working with "known" clean air, coming nearly all from compressed air; the filters situated around the path of the pieces also avoid the expulsion of unclean air into the buildings and/or to the exterior.

The filtering elements 5 have a novel arrangement, being mounted above the fluidization elements for downwards aspiration. The fluidization elements are pierced by very short tubes. The absence of elements external to the cage makes the modules more independent and more rapdily interchangeable.

The use of air circuits allows recovery of the maximum amount of heat issuing from operation of the ventilators and minimization of the energy input necessary for maintaining air suitable for powder deposition within the cage.

The nature of the central part B of the cage depends on the kind of coating to be applied and on the quantity of product to be deposited. The reserve 11 of powder is a container containing a fluidization unit 9 and optionally a sifter 20 which is also a separator for removing metal particles. The design of the wall 21 of the casing depends on the conditions of use of the product. The elements 22 for depositing powder are of any type, for example spray and/or electrostatic projection guns. These elements form part of the wall 21 or are removable elements adaptable for other cages. The guns can be fixed or movable, depending on the type of powder depositing to be carried out.

The elements 22 for forming the spray of powder can be used simultaneously or separately, depending on the deposition required. A sensor 23 indicates the level of powder and controls the introduction of fresh powder.

The structural elements thus defined are fixed on the inlet/outlet modules by simple means allowing them to be rapidly separated, for example: by screws, bonding tapes or preferably by self-gripping tapes.

The central module B does not contain any provision for aspiration, but acts as a reserve for powder. This reserve can be in two parts, one containing the recycled powder and the other the fresh powder. The sifter 20 allows processing of all the powder coming either from the reconditioning of the filtering elements of the inlet and outlet air-locks, or directly from non-deposition on the pieces, before going in the powder reserve.

The elements 22 for depositing powder are connected to the injectors 28 which draw the powder directly by means of dippers 10 in the reserve 11 of powder forming the bottom of the module B. This arrangement avoids the necessity for elements outside the cage and does away with ducting, a rapid wear area. The proposed arrangements allow access to the inside elements by separating the central part from the inlet/outlet modules, without anyone needing to enter the cage through the air-locks.

When there is a removable reserve, it can be emptied easily, even changed for the use of a product with different characteristics.

Rigidity of the cage is obtained by means of two angle bars 51 disposed over the whole length of the roof of the cage, on both sides of the slit allowing passage of the hangers supporting the pieces on which powder is to be deposited. The two angle bars 51 form between them a measured slit 52 of small width at the axis of the cage. These angle bars covering all the modules of the cage constitute both a guide rail for the hangers, and also reduce leakages of powder through the slit in the roof of the cage.

The angle bars, by making the top of the cage rigid, prevent bending and sagging of the plates of plastics material constituting the walls of the cage.

Figure 4:
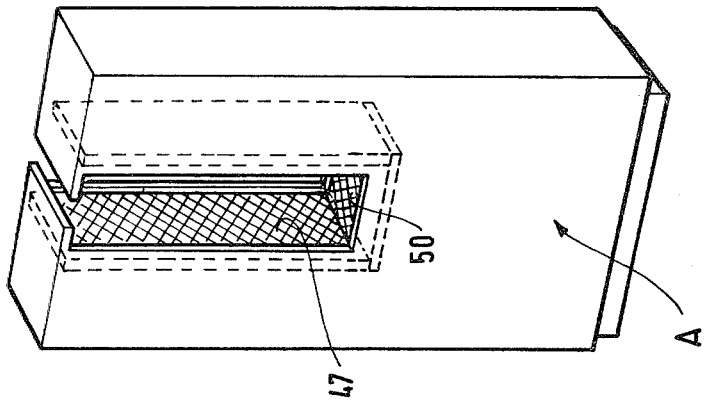
FIG. 4 is a perspective view of an inlet or outlet air-lock.

The inlet and outlet air-locks are reinforced by a U-shaped structure, as represented in FIG. 4, constituted by two strong U-shaped panels forming a hollow element facilitating the circulation of the recycled air.

The ends 53 of the angle bars are widened out to facilitate guiding of the hangers at their inlet to the cage.

Figure 6:
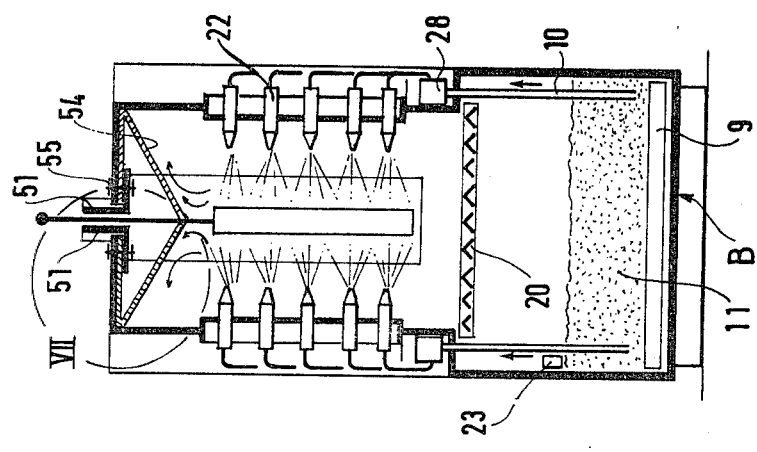
FIG. 6 is a view in section along the line VI—VI of FIG. 3.
Figure 5:
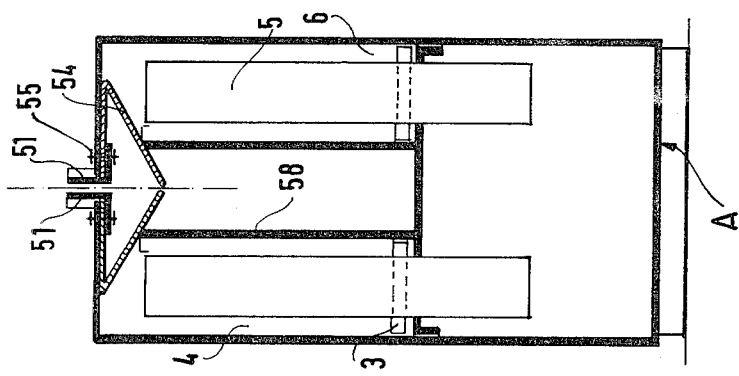
FIG. 5 is a view in section along the line V—V of FIG. 3.

A deflector (FIGS. 5, 6) in two parts 54 bent in the shape of a V, is disposed below the slit 52 within the cage. One wing of the deflector is caught between the roof and the angle bar by means of a bolt 55 and the other wing of the deflector is directed towards the vertical axis of the cage so as to impede projections of powder going in the direction of the slit 52 and to direct them towards the bottom of the cage.

Figure 8:
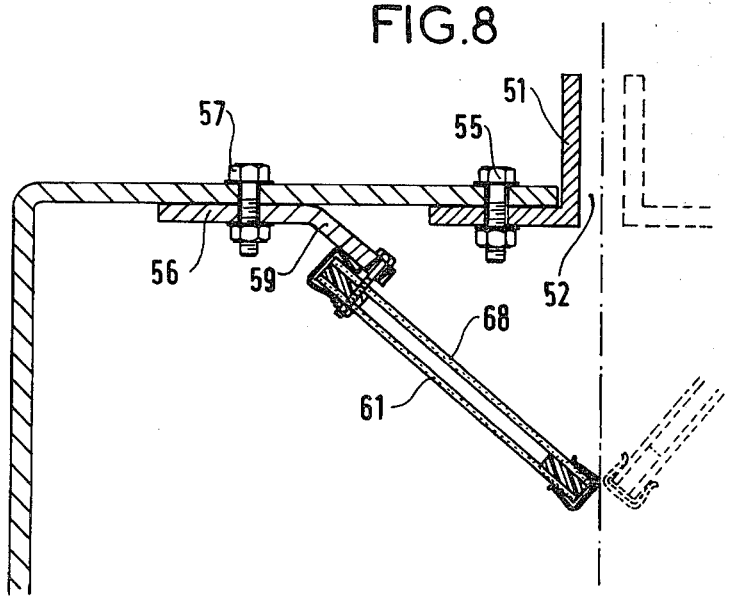
FIG. 8 shows a variant of a deflector of FIG. 7.

FIG. 8 represents a variant deflector 59, one part 56 of which is bent and fixed by bolt 57 to the roof of the cage.

Figure 9:
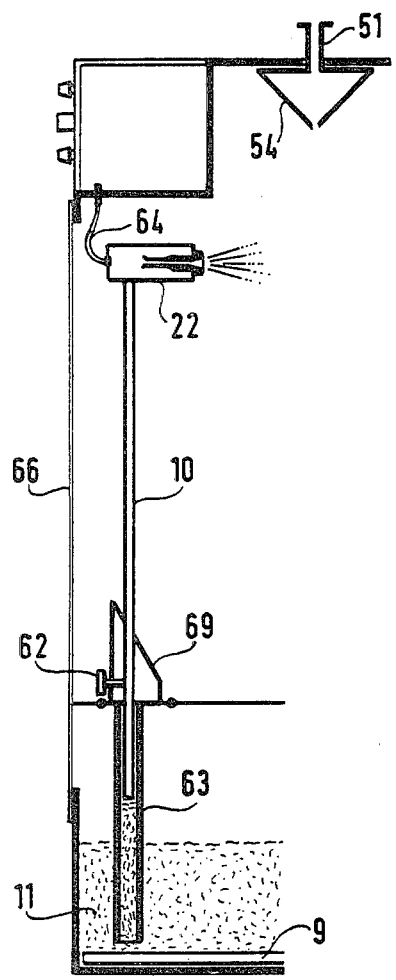
FIGS. 9 and 10 represent the arrangement of the powder projectors in the interior of the cage.
Figure 10:
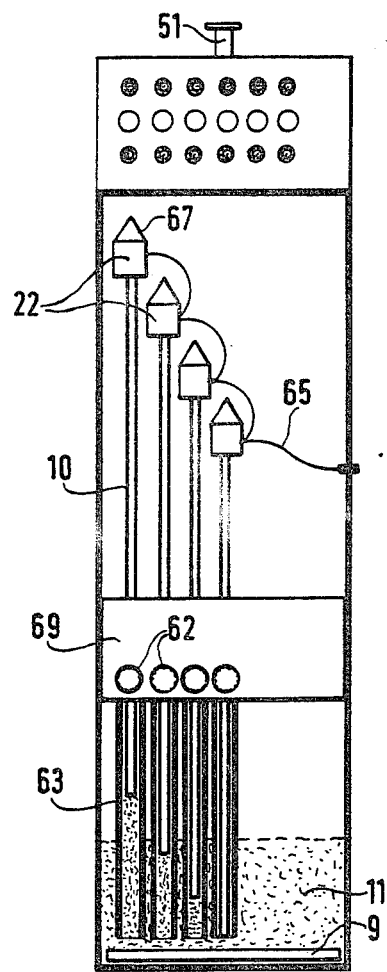

As shown in FIGS. 9 and 10, the elements for projecting powder are preferably placed within the module B for storage, projection and recovery of powder. These elements comprise projectors 22 supported by the tubes 10 which dip directly into the container 11 of powder. These tubes 10 for supplying powder to the projection elements can be adjusted in height, by means of a screw 62, connecting to a support 69 the tube 10 sliding in a tube 63. The projections are supplied with compressed air through a tube 64 and with high voltage by a cable 65. A removable panel 66 placed over a side opening of the module allows easy access to the projection elements. Electrostatic projection guns of the type described in the applicant's French Pat. No. 79 01 970 can be used to advantage. A cap 67 placed on the top of the gun allows deposition of powder on the latter to be avoided.

Implementation of the invention allows reinforcement of the structure of the cage; the securing of the angle bars to the roof of the central module allows the roofs of the various cages to be aligned. The positioning of the angle bars is such that the minimum space between the two angle bars can be substantially equal to the thickness of the hanger where is passes through the roof of the cage. The small slit thus created reduces the escape of powder through the roof of the cage in particular, especially if the hanger has a long plane part 60 at the level of the angle bar.

Figure 7:
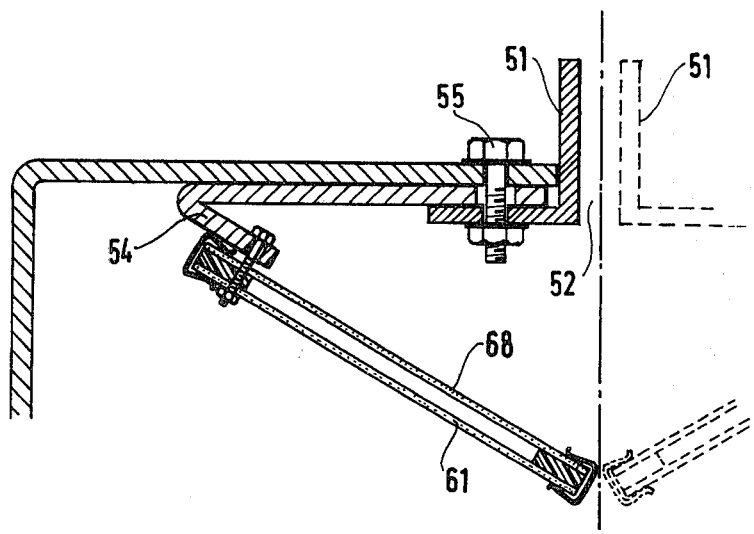
FIG. 7 is an enlarged view of a detail of FIG. 6.

The presence of a deflector in two parts of resilient material, for example, whose opposite wings meet, allows this slit to be completely sealed. The deflector particularly protects the fastenings of the hanger against the powder and avoids powder falling back onto the suspended piece which would cause faulty enamelling; this deflector can be constituted by an elongate fluidizing element 61 which prevents a thick deposit from being deposited. The deflector can present a double fluidization wall, a lower fluidizing element 61 and an upper fluidizing element 68, as represented in FIG. 7. These fluidizing elements can be of the type described in the applicant's French Pat. No. 79 01 969.

The installation can comprise several modules of type B allowing several coatings to be carried out, so that one could have, for example, a module for each colour of powder, for effecting coatings of different colours.

Figure 11:
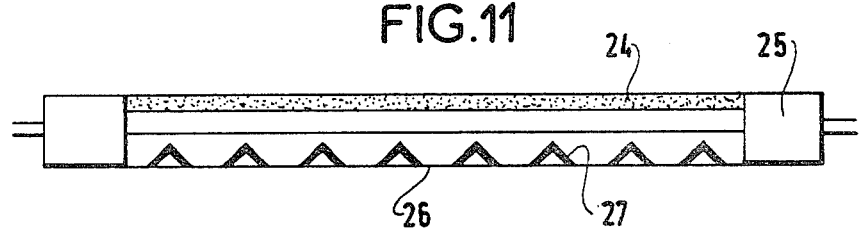
FIG. 11 shows the sifter an enlarged view.

FIG. 11 represents the construction of the sifter for removing metal particles. The sifter 20 is incorporated in section B of the cage; it comprises a filter cloth 24 fixed over a body urged into vibration by a vibrator system 25; a recoverer 26 of metal particles is fixed below the sieve and can, for example, be fixed onto the same body as the sieve. The recovery of very fine fillings is effected by flexible magnets 27, in the form of a ribbon or plates arranged on rigid elements. Almost all of the powder not deposited on the pieces falls directly onto the sifter, a small part going onto the filters; the configuration of the cage thus reduces clogging of the filtering elements and makes maximum use of the natural recycling of the powders. The whole of the powder passes through the sifter and through the recoverer of metal particles, so that only "clean" powder is projected.

The cage includes two fluidization units; one at 3 under the filtering elements collects powder which has been unclogged, the other at 9 fluidizing the powder of the reserve.

Electrical and pneumatic circuits are enclosed within the cage in compartments provided for this purpose.

The manufacturing material depends on the type of powder deposition selected; the cage is preferably to be constructed from material with a high dielectric strength, for example polypropylene, so as to avoid leakage current. The modular design allows access to its inside elements, without anyone going in via one of the air-locks; it eliminates all outer tubing so that there is consequently no wear, and allows increased accesibility. The direct recycling of air in the cage allows recovery of heat because of the ventilators, and consequently minimizes heat losses and energy input; moreover, the absence of direct personal contact with the environment of the cage allows the conditioning of recycling air to be adapted solely to the conditions of use.

The installation according to the invention presents the following advantages:

The circulation of air in the inlet and outlet modules created by the ventilators at the level of the filters causes a lowering of pressure in the module B in the region 43 and an excess pressure in the inlet or outlet air-lock in the region 44. In these conditions, the powder cannot escape through the orifices 45-46 of the cage provided for the passage of the pieces to be covered, while the surplus air provided by the compressed air elements for deposition of powder is allowed to leave; nearly all the air in the cage comes from compressed air. The air in the cage is reinjected into the air-locks, no air coming from the outside; the problems of reprocessing the air coming in and of removing workshop dust therefrom consequently does not arise. The cage of the vertical type allows movement of the pieces by a linear conveyor. The systems for projection and recycling (guns and dippers) are mounted on a replaceable assembly which is easily removed. The filtering air is recycled so as to form a current of air preventing lateral escape of powder; the final filter prevents particles of enamel being carried into the atmosphere of the workshop, should a filter deteriorate. Moreover, a differential manometer can be arranged to interrupt aspiration, should a filtering element become perforated.

The modules of the cage are of plastics material, without metal parts, so that the installation has only a minimum of parts earthed to reduce the leakage of static electricity and to optimise the electric charge on the powder. A laminar flow is achieved over the pieces so as not to remove the powder already deposited on the pieces.

The modular design of the cage allows an increase in its mobility and in the interchangeability of elements, especially as it needs no external system such as, for example, a filter or sifter.

The modules are assembled by means of self-gripping tapes ensuring sealing, rapid assembly and rapid dismantling. The modules can themselves be modular.

The cartridges of the filters can be put under high voltage in order to form an outer barrier against the powder, which also allows a reduction in the accumulation of powder in the filters. The same outer barrier against the powder can be obtained by placing electrostatic screens in the inlet and outlet air-locks.

The position of the dippers 10 allows a minimum path between the fluidized container and the elements for depositing powder to be obtained and therefore less wear on the equipment.

The compactness of the equipment allows mounting of the whole as one independent unit of increased reliability. The construction of such equipment is simple since the structure serves to guide the aspiration and return of the air. As the apparatus can be rapidly dismantled, it is easily moved, according to operating conditions.

What is claimed is:

1. In an installation for electrostatic deposition of powder on continuously travelling objects, said installation comprising:
    a conveyor,
    an elongated object treatment cage extending longitudinally and having a slot within the top of said cage extending throughout the length of said cage, an opening within one end of the cage forming a side entrance aligned with said slot and an opening within the opposite end of said cage forming an exit,
    said conveyor being positioned vertically above said cage, aligned with said slot and bearing hangers extending through said slot for supporting objects movable through the treatment cage from said entrance to said exit, a filtering system for removing excess powder from the air used in the coating operation, a system for supplying powder for electrostatic deposition and compressed air, and a tank for recovery of powder, the improvement wherein said cage comprises at least two, side-by-side modules, namely a first module and at least one second module having an end including a said cage end opening, said first module comprising means for storing and recovering powder and further containing means for projecting a mixture of powder and air onto the objects to be processed when within said first module, an opening between said first module and said second module aligned with said side entrance and exit and permitting said objects to be conveyed from said second module to the interior of the first module, and said at least one second module comprising; laterally spaced vertical walls defining a central passageway extending longitudinally over a portion of the length of said at least one second module with said passageway aligned with said entrance opening, air lock means, first filtering means, and a blower for drawing air and excess powder from said first module into said second module, for passage through said first filtering means for filtering excess powder, and for feeding air to said air-lock means to create an air lock at an air pressure in excess of atmospheric adjacent the end of said second module at said cage end opening such that air loaded with powder originating from said first module is prevented from escaping through said cage end opening and is filtered and recycled to said first module for further employment in the projection of powder onto the objects to be processed with said filtered air at a higher pressure than atmospheric so as to flow back through said central passageway towards said first module to prevent powder from escaping through said cage end opening.

2. An installation according to claim 1, wherein said at least two side-by-side modules comprise two second modules on respective sides of said first module, one being an inlet module for filtering and recycling of air on the inlet side of said first module and the other being an outlet module for filtering and recycling of air on the outlet side of said first module.

3. An installation according to claim 1, wherein said first module includes a powder projector-injector assembly having a removable dipper.

4. An installation according to claim 1, wherein said at least one second module comprises longitudinally spaced end walls including inlet and outlet openings, respectively, said at least one second module being formed of two parts: a first part contiguous with the means for storing, projecting and recovery of powder of said first module, with said first part containing said first filtering means, and a second part in the vicinity of said cage end opening including said air lock means.

5. An installation according to claim 4, wherein said first filtering means comprises vertical filtering elements and said blower is positioned below said vertical filtering elements for causing the recycling air to move in a downward direction through said vertical filtering elements.

6. An installation according to claim 1, wherein said blower comprises a ventilator integrated with the cage and positioned under the filtering elements.

7. An installation according to claim 4, further including a system for conditioning the air regulating the water content of the recycling air in the cage, and incorporated in said at least one second module.

8. An installation according to claim 4, wherein said air lock means comprises second filter means for filtering air after passage through said first filtering means.

9. An installation according to claim 8, wherein said second filtering means comprises electrostatic screens.

10. An installation according to claim 4, further comprising means for causing non-turbulent flow in said cage, said non-turbulent flow causing means comprising second filtering means extending parallel to the path of movement of said object to be processed within said air-lock means.

11. An installation according to claim 5, further comprising fluidization plates within said first part through which said filtering elements project, and wherein said air lock means comprises second filtering means for filtering air after passage through said first filtering means.

12. An installation according to claim 4, wherein said air-lock means comprises strong U-shaped panels forming a hollow element facilitating the circulation of recycled air through said at least one second module.

13. An installation according to claim 1, wherein said at least one second module includes at least one fluidizing element underlying said first filtering means, and wherein a third filtering means is situated above said at least one fluidizing element and beneath said first filtering means for filtering the powder returned to the storage tank.

14. An installation according to claim 13, further comprising a sifter in juxtaposition to said at least one fluidizing element for separating metal particles, said sifter comprising an assembly of flexible magnets.

15. An installation according to claim 1, wherein said at least two side-by-side modules are joined along abutting edges by self-gripping tapes to avoid leakage of powder between said at least two side-by-side modules.

16. An installation according to claim 1, wherein said means for projecting powder comprise powder projectors mounted on a tube having one end dipping directly into the means for recovery of powder.

17. An installation according to claim 1, wherein said modules comprise plates forming the walls of the cage, and wherein the cage includes two reinforcing angle bars extending along its whole length, covering said at least two modules to prevent leakage of powder between the walls of the modules and to maintain the tightness between said modules by preventing bending and sagging of the plates constituting the walls of the modules, and wherein said angle bars form a guiding rail for said hangers for suspending said objects and leaving between them a slit of relatively small width forming a passage for said hangers.

18. An installation according to claim 17, wherein the angle bars are widened out at their ends to ensure guiding of the hangers towards the slit.

19. An installation according to claim 17, wherein a deflector in two parts is disposed below the slit provided by the angle bars so as to impede projection of powder going in the direction of the slit and to direct the powder towards the bottom of the cage.

20. An installation according to claim 19, wherein the deflector is an element fluidizing powder towards the interior of the cage.

21. An installation according to claim 17, wherein the hangers are of plate form allowing the leakage area for powder to be minimized.

* * * * *